United States Patent
Kakuchi et al.

(10) Patent No.: US 12,002,366 B2
(45) Date of Patent: Jun. 4, 2024

(54) TAXI SYSTEM

(71) Applicant: TOYOTA JIDOSHA KABUSHIKI KAISHA, Toyota (JP)

(72) Inventors: Makoto Kakuchi, Toyota (JP); Osamu Izumida, Nagoya (JP); Shunji Inoue, Okazaki (JP); Takumi Hamajima, Takatsuki (JP); Mitsushi Kintaka, Kariya (JP); Toshihiro Andou, Kariya (JP); Masamitsu Takahira, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 17/652,038

(22) Filed: Feb. 22, 2022

(65) Prior Publication Data

US 2022/0270489 A1    Aug. 25, 2022

(30) Foreign Application Priority Data

Feb. 24, 2021    (JP) .................................. 2021-027517

(51) Int. Cl.
| | |
|---|---|
| *B60W 30/16* | (2020.01) |
| *B60Q 1/00* | (2006.01) |
| *B60Q 1/50* | (2006.01) |
| *B60W 30/165* | (2020.01) |
| *B60W 60/00* | (2020.01) |
| *G05D 1/00* | (2006.01) |
| *G05D 1/02* | (2020.01) |
| *G06Q 10/02* | (2012.01) |
| *G06Q 50/40* | (2024.01) |
| *G08G 1/00* | (2006.01) |

(52) U.S. Cl.
CPC ............... *G08G 1/202* (2013.01); *B60Q 1/50* (2013.01); *B60W 30/165* (2013.01); *B60W 60/00253* (2020.02); *G05D 1/0295* (2013.01); *G06Q 10/02* (2013.01); *G06Q 50/40* (2024.01); *G08G 1/205* (2013.01); *G08G 1/22* (2013.01)

(58) Field of Classification Search
CPC .......... G08G 1/202; G08G 1/205; G08G 1/22; B60Q 1/50; B60W 30/165; B60W 60/00253; G05D 1/0295; G06Q 10/02; G06Q 50/40; G06Q 10/103; G06Q 10/06312; G06Q 30/0645
See application file for complete search history.

(56) References Cited

U.S. PATENT DOCUMENTS

2002/0030590 A1* 3/2002 Dieckmann ............... B60D 1/62
340/475
2008/0308369 A1* 12/2008 Louis ................... A45C 7/0045
190/108
(Continued)

FOREIGN PATENT DOCUMENTS

| JP | 2017174208 A | 9/2017 |
|---|---|---|
| JP | 2019-001227 A | 1/2019 |

(Continued)

*Primary Examiner* — Rodney A Butler
(74) *Attorney, Agent, or Firm* — Dickinson Wright, PLLC

(57) ABSTRACT

A taxi system includes a taxi vehicle that runs autonomously with a user on board and transports the user, and at least one auxiliary vehicle capable of registering the taxi vehicle as a linkage target and running by following the taxi vehicle as the linkage target with luggage loaded in the at least one auxiliary vehicle.

9 Claims, 10 Drawing Sheets

(56) References Cited

U.S. PATENT DOCUMENTS

| | | | | |
|---|---|---|---|---|
| 2009/0240575 A1* | 9/2009 | Bettez | .................... | G06Q 20/10 |
| | | | | 194/902 |
| 2018/0239362 A1* | 8/2018 | Amla | ................... | G05D 1/0011 |
| 2019/0187728 A1* | 6/2019 | Tsai | ....................... | G01C 21/08 |
| 2019/0236519 A1 | 8/2019 | Kaneko et al. | | |
| 2020/0094830 A1 | 3/2020 | Ito et al. | | |
| 2020/0341467 A1* | 10/2020 | Glendenning | ....... | G05D 1/0088 |
| 2020/0398840 A1 | 12/2020 | Kurihara | | |

FOREIGN PATENT DOCUMENTS

| | | |
|---|---|---|
| JP | 2019-067248 A | 4/2019 |
| JP | 2019133373 A | 8/2019 |
| JP | 2019-159585 A | 9/2019 |
| JP | 2020-083010 A | 6/2020 |
| JP | 2020-086865 A | 6/2020 |
| JP | 2020-135028 A | 8/2020 |
| JP | 2020176389 A | 10/2020 |

\* cited by examiner

TAXI SYSTEM

CROSS REFERENCE TO RELATED APPLICATION

This application claims priority to Japanese Patent Application No. 2021-027517 filed on Feb. 24, 2021, which is incorporated herein by reference in its entirety including the specification, claims, drawings, and abstract.

TECHNICAL FIELD

The present disclosure relates to a taxi system including a taxi vehicle that runs autonomously with a user on board and transports the user.

BACKGROUND

The use of a self-driving vehicle as a taxi vehicle has long been proposed. For example, Patent Document 1 discloses a taxi service system that uses a self-driving vehicle.

CITATION LIST

PATENT DOCUMENT 1: JP 2017-174208 A

Taxi users may need to transport large-sized luggage together with the users themselves. Not being able to transport the large-sized luggage with the users would greatly decrease the convenience of the users. One solution to this is to provide a bigger taxi vehicle to suit to transportation of the large-sized luggage. However, the bigger taxi vehicle naturally requires increased manufacturing cost of the vehicle, leading to the increase of taxi fare. In addition, the users may carry small luggage, and such users might feel that the bigger taxi is over-engineered and its fare unnecessarily expensive.

Another solution might be to change the number of taxi vehicles to be used depending on the size of the luggage, instead of increasing the size of the taxi vehicle. For example, a user who carries small-sized luggage may use a single taxi vehicle, while a user who carries large-sized luggage may use an additional taxi vehicle to load the luggage other than the taxi vehicle that the user. This configuration enables transportation of the large-sized luggage while avoiding the need for the bigger taxi vehicle.

However, the self-driving taxi vehicles are equipped with many expensive and sophisticated components (e.g., sensors and processors) to enable self-driving. In addition, the taxi vehicles that transport passengers are equipped with various mechanisms to ensure the safety of the passengers. If such expensive taxi vehicles manufactured for transportation of the passengers were used only for transportation of luggage, the transportation cost of the luggage would tend to be unnecessarily high. In other words, it has been difficult in the taxi system to improve the convenience of users while minimizing cost increase.

In view of the above, it is an object of the present disclosure to provide a taxi system capable of improving the convenience of users while minimizing cost increase.

SUMMARY

The taxi system disclosed herein includes a taxi vehicle that runs autonomously with a user on board and transports the user, and at least one auxiliary vehicle capable of registering the taxi vehicle as a linkage target and running by following the taxi vehicle registered as the linkage target with luggage loaded in the auxiliary vehicle.

This configuration enables the auxiliary vehicle to be used for transporting the luggage that cannot be loaded in the taxi vehicle, thus improving the convenience of the user. Since the auxiliary vehicle runs by following the taxi vehicle, no sophisticated and expensive sensors and controllers for automated driving are needed, thus reducing the cost of the luggage transportation. As a result, the convenience of the user can be improved while minimizing the cost increase.

The auxiliary vehicle may include an auxiliary sensor group including at least one of a sensor that detects the driving environment of the auxiliary vehicle and a sensor that detects luggage loading state, and the auxiliary vehicle may transmit a detection result of the auxiliary sensor group to the taxi vehicle to be linked.

This configuration enables an advanced controller installed in the taxi vehicle to be linked to recognize the driving environment and/or the luggage loading state of the auxiliary vehicle. Accordingly, the taxi vehicle to be linked can take appropriate action when any trouble occurs in the driving environment or the luggage loading state of the auxiliary vehicle. As a result, the auxiliary vehicle can transport the luggage more appropriately.

The auxiliary vehicle may include a follow-up sensor that directly or indirectly detects a relative positional relation with the taxi vehicle to be linked, and the auxiliary vehicle may control acceleration, deceleration, and steering of the auxiliary vehicle in a manner that the detection result of the follow-up sensor maintains a specific relative positional relation.

This configuration enables the auxiliary vehicle to run without carrying out complicated calculations or sensing by itself. Therefore, there is no need to install sophisticated and expensive sensors and controllers in the auxiliary vehicle, thus reducing the cost of luggage transportation.

When the taxi vehicle is linked to at least one auxiliary vehicle, the taxi vehicle controls driving of the taxi vehicle by taking an entire length of a vehicle fleet consisting of the taxi vehicle and the at least one auxiliary vehicle as an entire length of the taxi vehicle.

This configuration enables the taxi vehicle and the auxiliary vehicle to properly make a right/left turn or be parked.

The taxi vehicle and the at least one auxiliary vehicle output, when linked with each other, information indicating the linkage in a visually recognizable form when viewed from outside.

This configuration enables other vehicles and people to expect linked running of the taxi vehicle and the at least one auxiliary vehicle, so that the safety of both the vehicles and people can be improved.

The auxiliary vehicle may include a luggage container to hold the luggage, and the taxi system may include the at least one auxiliary vehicle of a plurality of types having different characteristics in terms of the luggage container.

This configuration enables the user to select an appropriate auxiliary vehicle according to the type and size of the luggage, thus achieving more appropriate transportation of the luggage of the user.

The taxi system further includes a management device that manages dispatching of the taxi vehicle and receives a usage request of the taxi vehicle from the user. When the received usage request includes information on the size of the luggage, the management device may determine the number of the auxiliary vehicles to be dispatched to the user in accordance with the information on the size of the luggage, and may dispatch the taxi vehicle and the auxiliary vehicles to the user with the determined number of the auxiliary vehicles linked with the taxi vehicle.

This configuration enables the user to avoid considering about the required number of the auxiliary vehicles, so that the user can use the auxiliary vehicles more easily.

The taxi system may further include at least one waiting place where at least one auxiliary vehicle linked with no taxi vehicle is waiting. The user is allowed to select the auxiliary vehicle to be used by the user from the at least one auxiliary vehicle waiting at the waiting place.

Since the waiting place where the auxiliary vehicles wait is set, the user who is aboard the taxi vehicle can easily find the auxiliary vehicle to be linked to the taxi vehicle by moving to the waiting place along with the taxi vehicle in use.

After the use of the auxiliary vehicle ends, the taxi vehicle that has been linked to the auxiliary vehicle during the use may keep the link with the auxiliary vehicle and run to a new destination of the auxiliary vehicle to guide the auxiliary vehicle to the new destination.

This configuration enables the auxiliary vehicle to run to a new destination (such as a waiting place) after the end of use.

After the use of the auxiliary vehicle ends, the taxi vehicle that has been linked to the auxiliary vehicle during the use may cancel its linkage with the auxiliary vehicle, while another taxi vehicle may run to the auxiliary vehicle, start to link up with the auxiliary vehicle, and run to a new destination of the auxiliary vehicle to guide the auxiliary vehicle to the new destination.

This configuration enables the taxi vehicle that has been linked with the auxiliary vehicle during use to be immediately dispatched to a new user, and the auxiliary vehicle that has been used to run to a new destination. As a result, the taxi vehicle can be effectively used, and the auxiliary vehicle can be properly collected.

The taxi system disclosed herein can improve the convenience of the user while minimizing cost increase.

BRIEF DESCRIPTION OF DRAWINGS

Embodiment of the present disclosure will be described below with reference to the accompanying drawings, in which.

DESCRIPTION OF EMBODIMENTS

Figure 1:
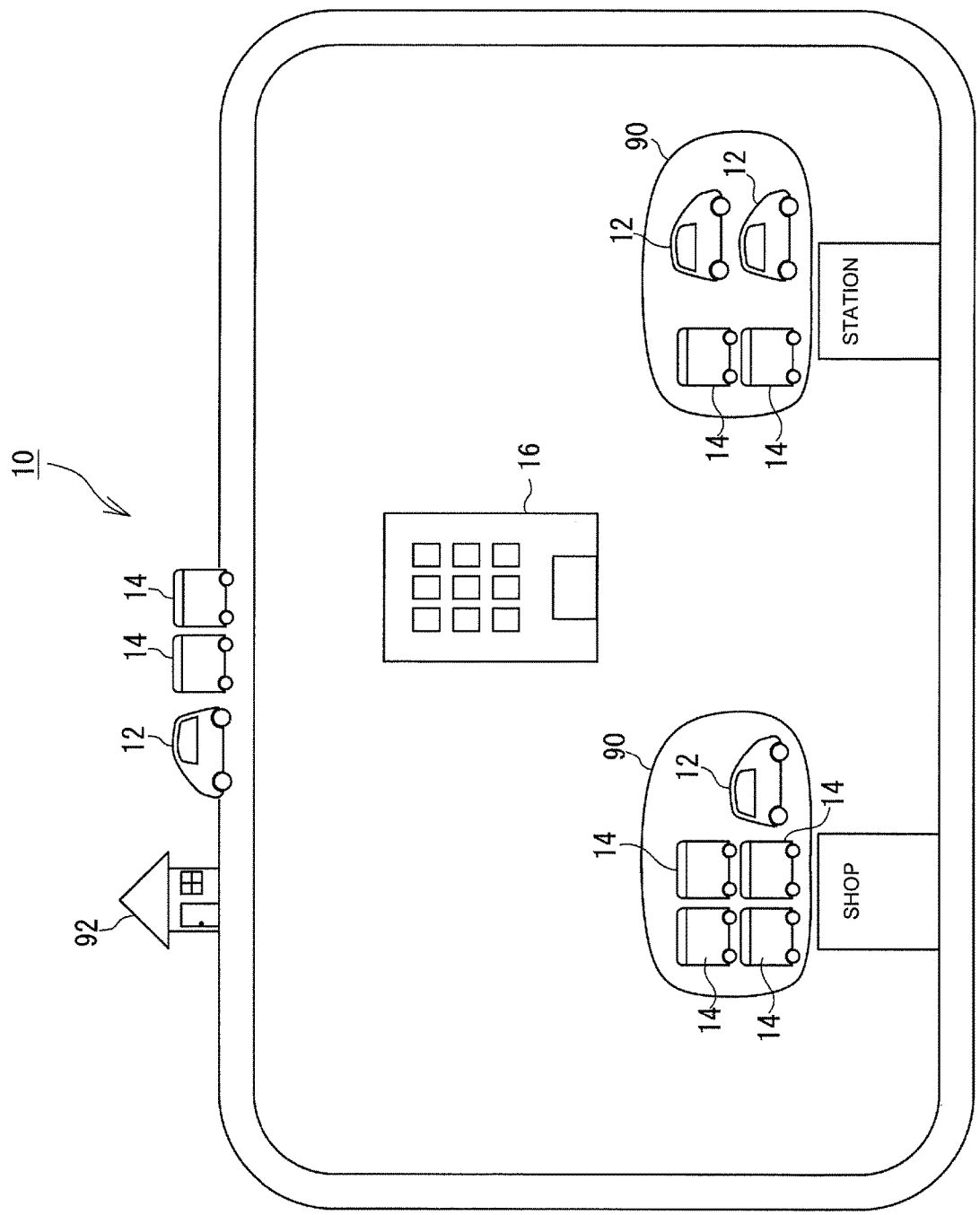
FIG. 1 is a conceptual view of a taxi system.

A configuration of a taxi system 10 will be described below with reference to the accompanying drawings. FIG. 1 is a conceptual diagram of the configuration of the taxi system 10. The taxi system 10 includes a plurality of taxi vehicles 12, a plurality of auxiliary vehicles 14, and a management device 16.

The taxi vehicles 12 are vehicles for transporting users to their destinations on an individual contract basis upon request from the users. In the present embodiment, each taxi vehicle 12 is a single passenger vehicle with a capacity of one passenger. Obviously, infants and young children are not counted as passengers, and can ride together with an adult. In addition, the taxi vehicle 12 is an automated driving vehicle in which all dynamic driving tasks are performed on the vehicle side. Therefore, no driver is aboard the taxi vehicle 12.

As used herein, "automated driving" refers to performing most of the dynamic driving tasks by the vehicles, corresponding to, for example, levels 3 to 5 of the standards defined by the Society of Automotive Engineers (SAE), a United States-based association for automobiles. According to the SAE standards, level 3 is a form of driving in which all dynamic driving tasks are automated in certain locations, such as on freeways, but in emergency situations, driver operation is required. Level 4 is a form of driving in which all dynamic driving tasks are automated only in specific locations, and emergency responses are also handled automatically. Level 5 is a form of driving, so-called "fully automated driving", in which automated driving is enabled in almost all conditions without any restriction on locations or the like.

The auxiliary vehicles 14 are vehicles designed to transport luggage and are not intended to carry passengers. Each auxiliary vehicle 14 can be linked with a certain taxi vehicle 12 as needed. Here, "link" means to communicate with a linked counterpart to obtain information or directions and to determine at least part of the operation of itself according to the obtained information or directions. Thus, the auxiliary vehicle 14 communicates with the taxi vehicle 12 which is registered as a linked counterpart to obtain information or directions, and determines at least part of the operation of the auxiliary vehicle 14 according to the obtained information or directions.

The auxiliary vehicle 14 cannot run autonomously by itself, but follows the taxi vehicle 12 to be linked. Here, "follow" means to follow the taxi vehicle 12 to be linked so as to run the same route as the linked taxi vehicle 12. In other words, the auxiliary vehicle 14 only follows the linked taxi vehicle 12 and does not perform automated driving. There is no need, therefore, for the auxiliary vehicle 14 to include expensive and sophisticated components (e.g., expensive sensors and processors) that are required for automated driving. In addition, since the auxiliary vehicle 14 is not designed to carry passengers, no mechanism to ensure safety of passengers (e.g., airbags or the like) is needed. As a result, the auxiliary vehicle 14 can be made more inexpensive and more compact than the taxi vehicle 12.

A user 100 is aboard the taxi vehicle 12 and loads the luggage, if it is not accommodated in the taxi vehicle 12, in the auxiliary vehicle 14. The auxiliary vehicle 14 transports the luggage of the user 100 by running to follow the taxi vehicle 12 (i.e., the taxi vehicle 12 to be linked) that the user is aboard.

The management device 16 manages dispatching of the taxi vehicles 12 and the auxiliary vehicles 14. The management device 16 collects and manages the positional information and the operational state of each of the plurality of taxi vehicles 12 and the plurality of auxiliary vehicles 14. The operational state of the taxi vehicles 12 and the auxiliary vehicles 14 includes, for example, standby, in service, out of service, pickup, and the like. The management device 16 calculates necessary deployment of the taxi vehicles 12 and the auxiliary vehicles 14 by taking into account the requests from users and the current distribution state of vehicles and people in town, and outputs a dispatch direction to the taxi vehicles 12 and the auxiliary vehicles 14. In response, the taxi vehicles 12 and the auxiliary vehicles 14 travel appropriately according to the dispatch direction.

A plurality of waiting places 90 are provided in town where the taxi vehicles 12 and the auxiliary vehicles 14 can wait. Any places where the taxi vehicle 12 or the auxiliary vehicles 14 are parked can be designated as the waiting places 90. Accordingly, the waiting places 90 may be located near public facilities to be used by a large number of people, such as shops and stations.

There are two types of use of the taxi vehicle 12, the pickup service in which the user 100 calls the taxi vehicle 12 and starts using it, and the direct use in which the user 100 moves to the vicinity of the taxi vehicle 12 and starts using it. The pickup service further includes reservation service in which the user designates future date and time when the user wishes to use the taxi. The two types of use are described below with reference to FIGS. 2 and 3.

Figure 2:
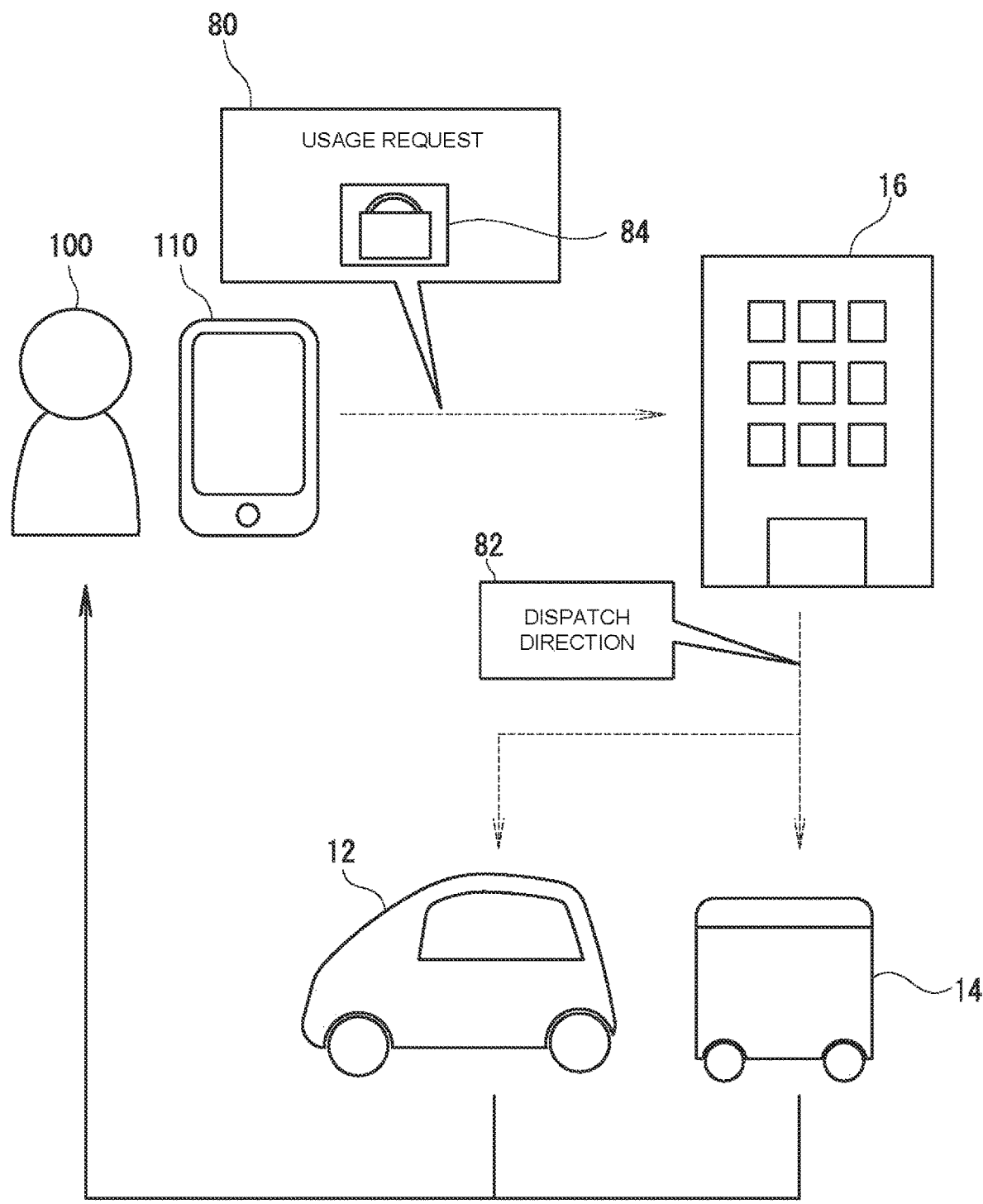
FIG. 2 is a conceptual view of using pickup service.

FIG. 2 is a conceptual view of using the pickup service. In the case of using the pickup service, the user 100 operates an information terminal managed by the user 100 (hereinafter referred to as the "user terminal 110") and transmits a usage request 80 to the management device 16. The usage request 80 includes at least the date and time and a location of boarding desired by the user. The usage request 80 may further include at least one of a destination, a payment method, the number of taxi vehicles 12 to be used, and other request items (e.g., air conditioning of the taxi vehicle 12). When the user 100 wishes to use the auxiliary vehicle 14 together with the taxi vehicle 12, the user also transmits information concerning the use of the auxiliary vehicle 14 to the management device 16 as part of the usage request 80. The information concerning the use of the auxiliary vehicle 14 will be described later.

The management device 16 dispatches the taxi vehicle 12 and the auxiliary vehicle 14 in accordance with the received usage request 80. Specifically, the management device 16 transmits a dispatch direction 82 to the taxi vehicle 12 so that the taxi vehicle 12 can arrive at the boarding location at the boarding date and time designated in the usage request 80. Upon receiving the dispatch direction 82, the taxi vehicle 12 travels to the boarding location in time to meet the designated boarding date and time by automated driving If the usage request 80 includes the information concerning the use of the auxiliary vehicle 14, the management device 16 identifies the number of auxiliary vehicles 14 that satisfy the request of the user 100. Then, the management device 16 instructs linkage between the identified number of auxiliary vehicles 14 and the taxi vehicle 12 as the dispatch direction 82. Upon receiving the direction, the auxiliary vehicles 14 and the taxi vehicle 12 register each other as the vehicle to be linked. Registered as the vehicle to be linked, each auxiliary vehicle 14 can travel to the boarding location together with the linked taxi vehicle 12.

When the boarding date and time comes, the user 100 boards the dispatched taxi vehicle 12 at the boarding location and starts using the taxi vehicle 12. The user 100 also loads the luggage that is not accommodated in the taxi vehicle 12 in the auxiliary vehicle 14 linked to the taxi vehicle 12. In this way, the luggage is transported together with the user 100.

Figure 3:
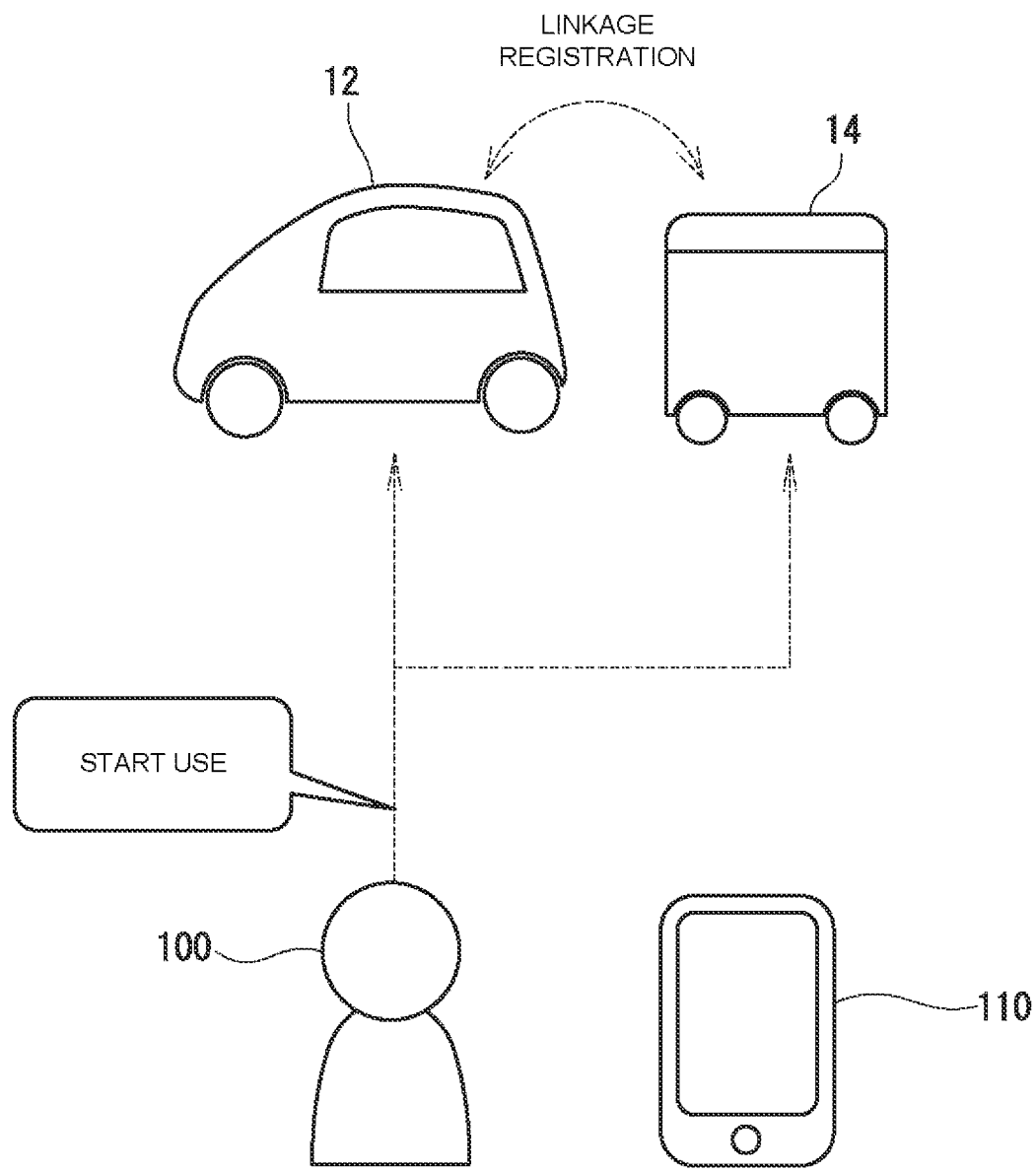
FIG. 3 is a conceptual view of direct use.

Next, the direct use is described. FIG. 3 is a conceptual view of the direct use of the taxi vehicle. In the case of the direct use, the user 100 moves to the vicinity of the taxi vehicle 12 which is in the standby state and notifies the taxi system 10 of the start of use of the taxi vehicle 12. Here, the notice of the start of use may be made using the user terminal 110 or using an input device mounted on the taxi vehicle 12. Thus, the user 100 may operate the user terminal 110 to transmit data indicating the start of use to the taxi vehicle 12. Alternatively, the user 100 may board the taxi vehicle 12 and operate the input device (e.g., a touch panel) mounted on the taxi vehicle 12 to notify the taxi vehicle 12 of the start of use. Upon receiving the notice of the start of use, the taxi vehicle 12 notifies the management device 16 that the taxi vehicle 12 has started transportation of the user 100; i.e., that the taxi vehicle 12 is in service.

When the luggage cannot be accommodated in the taxi vehicle 12, the user 100 also uses the auxiliary vehicle 14. In order for the user 100 to use the auxiliary vehicle 14, the taxi vehicle 12 and the auxiliary vehicle 14 need to register each other as the linkage target. In the following description, the registration of vehicles as the linkage target is referred to as "linkage registration." The linkage registration may be made using the user terminal 110 or using the input device mounted on the taxi vehicle 12 or the auxiliary vehicle 14. The detailed procedures of the linkage registration will be described later. After the linkage registration is established, the user 100 loads the luggage on the auxiliary vehicle 14. The auxiliary vehicle 14 then transports the luggage by running to follow the vehicle to be linked.

In both the pickup use and the direct use, the user 100 declares the end of use of the taxi vehicle 12 once the user reaches a destination 92. Upon receiving the notice of the end of use, the fare of both the taxi vehicle 12 and the auxiliary vehicle 14 is settled. After the settlement, the taxi vehicle 12 moves to the next destination or waiting place in accordance with the dispatch direction 82 from the management device 16. At this time, the auxiliary vehicle 14 may move with the taxi vehicle 12, or may wait on site until another taxi vehicle 12 dedicated for collection arrives. The operation of the auxiliary vehicle 14 after payment will also be described later.

Figure 4:
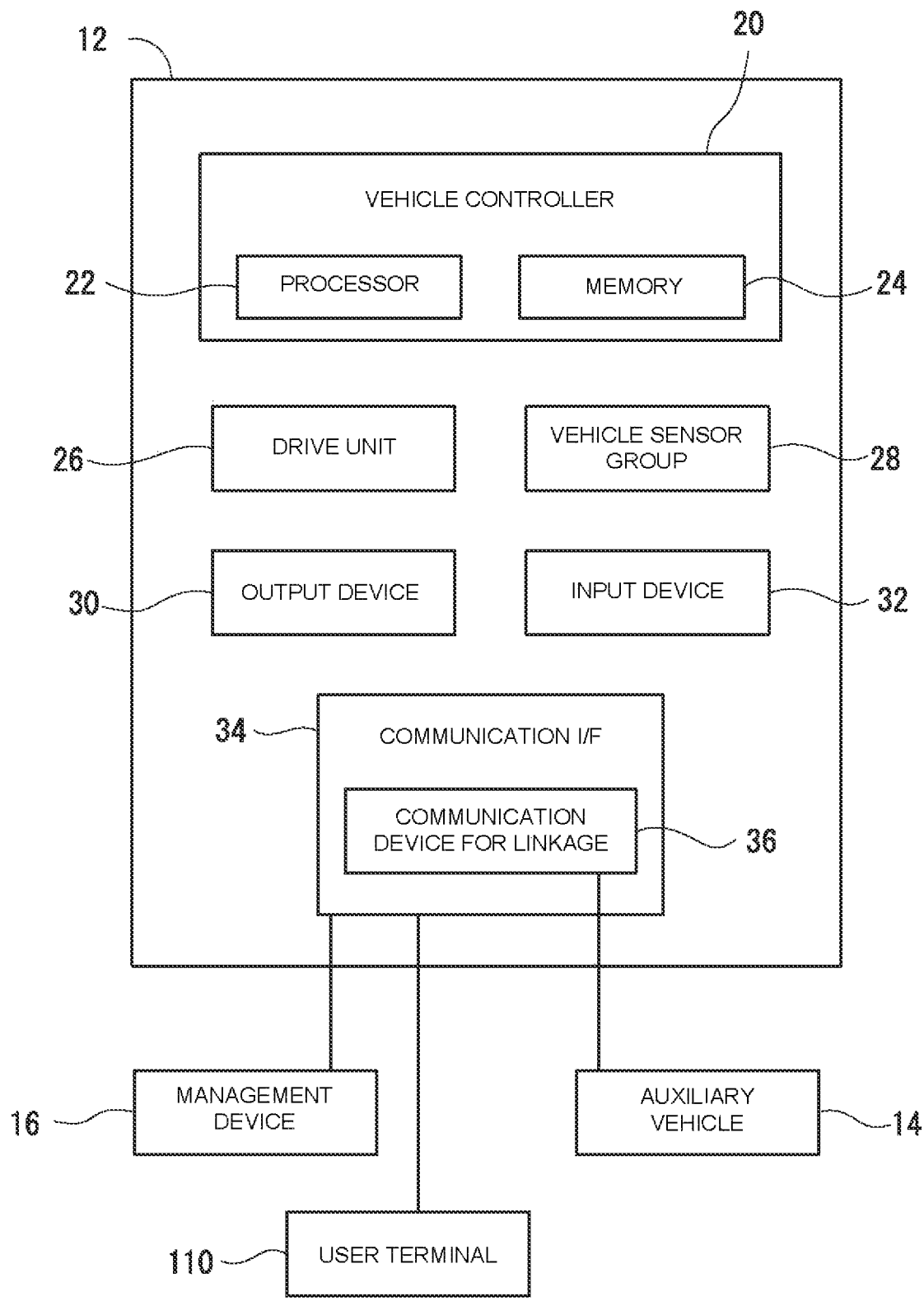
FIG. 4 is a block diagram illustrating a configuration of a taxi vehicle.

Next, the configurations of the taxi vehicle 12, the auxiliary vehicle 14, and the management device 16 are described. FIG. 4 is a block diagram of the taxi vehicle 12. A drive unit 26 is a device that generates mechanical actions to run the taxi vehicle 12, including, for example, an engine, a power transmission device, brakes, a suspension mechanism, and a steering device. A vehicle sensor group 28 includes at least one sensor for sensing various information necessary for running the taxi vehicle 12. For example, the vehicle sensor group 28 includes sensors for detecting the surrounding environment of the taxi vehicle 12 (e.g., a camera, a light detection and ranging (LiDAR) device, a millimeter wave radar, an ultrasonic sensor, or the like), sensors for detecting the current position of the taxi vehicle 12 (e.g., a global positioning system (GPS) or the like), and sensors for detecting the running state of the taxi vehicle 12 (e.g., an acceleration sensor, a gyro sensor, or the like). The information detected by the vehicle sensor group 28 is transmitted to a vehicle controller 20. The vehicle controller 20 calculates the amount of acceleration, deceleration, and steering of the taxi vehicle 12 in accordance with the information detected by the vehicle sensor group 28, and drives the drive unit 26.

An output device 30 is a device that presents information to the user 100, and may include, for example, at least one of an indicator, a speaker, and a lamp. An input device 32 is a device that accepts operational input from the user 100 and may include, for example, at least one of a touch panel, a keyboard, a switch, a lever, a pedal, and a microphone.

A communication interface (I/F) 34 communicates with information devices outside the vehicle using communication technology. In this case, the information devices to be communicated with include, for example, the management device 16, the user terminal 110, the auxiliary vehicles 14, and other taxi vehicles 12. Such communication may be carried out using mobile data communication provided by mobile phone companies, short-range wireless communication such as Bluetooth (registered trademark), or a dedicated communication line.

A communication device for linkage 36 is one of the constituent components of the communication I/F 34 and is a communication device for communicating with the auxiliary vehicle 14. The communication device for linkage 36 may use a general-purpose communication network such as mobile data communication, or may use a dedicated radio communication technology for inter-vehicle communication. The communication device for linkage 36 may also use the short-range wireless communication technology such as Bluetooth. The taxi vehicle 12 communicates with the auxiliary vehicles 14 via the communication device for linkage 36 in order to enable the auxiliary vehicle 14 to follow the taxi vehicle 12, which will be described later.

The vehicle controller 20 controls driving of the taxi vehicle 12. For example, the vehicle controller 20 recognizes the surrounding environment of the taxi vehicle 12 according to the detection results from the vehicle sensor group 28, and controls the operation of the drive unit 26 for the safe traveling of the taxi vehicle 12. In addition, the vehicle controller 20 communicates with the auxiliary vehicle 14 via the communication device for linkage 36, and outputs directions to the auxiliary vehicle 14 as necessary so that the auxiliary vehicle 14 can safely follow the vehicle Such a vehicle controller 20 is physically a computer including a processor 22 and a memory 24. The "computer" also includes a microcontroller in which a computer system is incorporated into a single integrated circuit. The "processor 22" refers to a processor in a broad sense, and includes a general-purpose processor (e.g., a central processing unit (CPU) or the like) and a dedicated processor (e.g., a graphics processing unit (GPU), an application specific integrated circuit (APEC), a field programmable integrated circuit (FPGA), a programmable logical device, or the like). The processor 22 does not have to be a single physical component, and may include more than one processors that are physically separated from each other. Similarly, the memory 24 does not have to be a single physical component, and may include more than one memories that are physically separated from each other. The memory 24 may include at least one of a semiconductor memory (e.g., a random access memory (RAM), a read-only memory (ROM), solid state drive, or the like) and a magnetic disk (e.g., hard disk drive).

Figure 5:
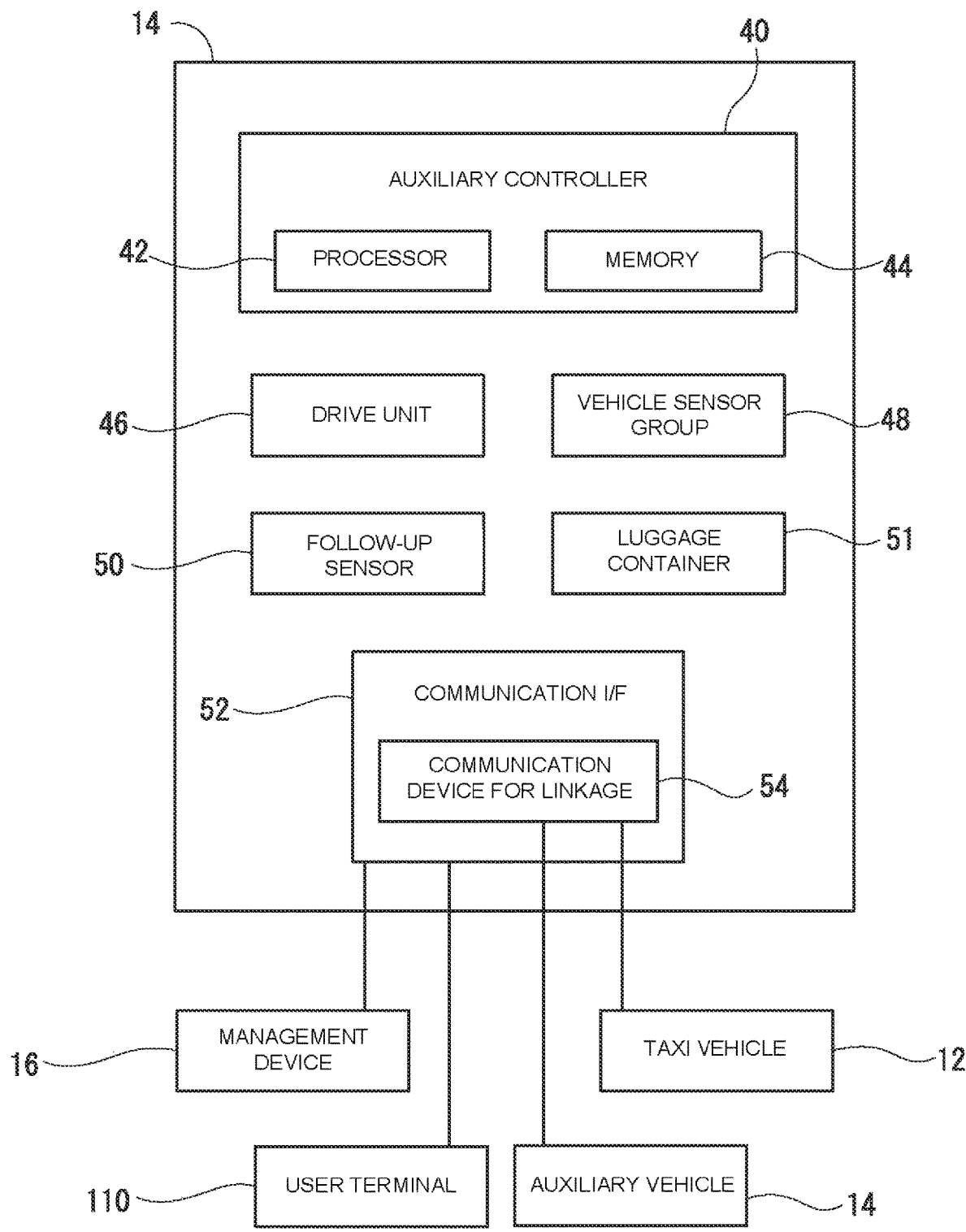
FIG. 5 is a block diagram illustrating a configuration of an auxiliary vehicle.

FIG. 5 is a block diagram of the auxiliary vehicle 14. A drive unit 46 is a device that generates mechanical actions to run the auxiliary vehicle 14, and includes, for example, an engine, a power transmission device, brakes, a steering device, and the like. As mentioned above, the auxiliary vehicle 14 is not intended to carry passengers. Therefore, the drive unit 46 of the auxiliary vehicle 14 has a cheaper and simpler configuration with lower quality vibration, quietness, and safety controls than those of the drive unit 26 of the taxi vehicle 12.

An auxiliary sensor group 48 includes at least one sensor and detects at least one of the traveling environment of the auxiliary vehicle 14 and the loading state of the luggage. The traveling environment includes the position, a traveling speed, acceleration, the presence of surrounding objects, and the like of the auxiliary vehicle 14. To detect the traveling environment of the auxiliary vehicle 14, the auxiliary sensor group 48 may include at least one of a position sensor, a speed sensor, an acceleration sensor, a gyro sensor, a LiDAR device, a millimeter wave radar, an ultrasonic sensor, and a camera. The loading state of the luggage includes, for example, whether the luggage has fallen or turned. To detect the loading state of the luggage, the auxiliary sensor group 48 may include, for example, an object sensor, a weight sensor, a camera, or the like. Again, the auxiliary vehicle 14 does not run autonomously by itself, but follows the taxi vehicle 12. Therefore, it is not necessary for the auxiliary vehicle 14 to perform detailed detection of the traveling environment. Therefore, the sensors that make up the auxiliary sensor group 48 may be of fewer types and have less detection capability than the sensors that make up the vehicle sensor group 28. In other words, the auxiliary sensor group 48 can have a less expensive and simpler configuration than that of the vehicle sensor group 28.

A follow-up sensor 50 is a sensor that detects the relative positional relation with the taxi vehicle 12 to be linked. The detection of the relative positional relation may be performed indirectly. Thus, for example, the follow-up sensor 50 may acquire the relative positional relation with the taxi vehicle 12 by detecting the relative positional relation of another auxiliary vehicle 14 which runs by keeping a predetermined positional relation with the taxi vehicle 12. The follow-up sensor 50 may be, for example, a signal sensor that detects the intensity of a tracking signal output from the taxi vehicle 12 or another auxiliary vehicle 14 (hereinafter referred to as the "vehicle to be detected") which runs ahead of the auxiliary vehicle 14. In this case, the auxiliary vehicle 14 includes two or more signal sensors as the follow-up sensors 50 to identify a distance to the vehicle to be detected according to the intensity of the tracking signal received at each signal sensor, and identify the direction of the vehicle to be detected from a difference in the signal intensities detected by the signal sensors. Alternatively, the follow-up sensor 50 may be a camera that captures images of the vehicle to be detected. Alternatively, the follow-up sensor may be a sensor (e.g., a millimeter wave radar or the like) that transmits electromagnetic waves or ultrasonic waves and uses the reflected waves to detect the relative position of the vehicle to be detected (i.e., the vehicle to be followed).

A luggage container 51 is a space for accommodating the luggage. The form of the luggage container 51 is not limited, and it may be, for example, container-like shaped or bag-like shaped to stably accommodate the luggage of the user 100. The taxi system 10 may include a plurality of types of auxiliary vehicles 14 with different characteristics in terms of the luggage container 51. For example, different types of auxiliary vehicles 14 may have different sizes and shapes of the luggage container 51. By allowing variations in the size and shape of the luggage container 51, the luggage of various shapes and sizes can be accommodated. One luggage container 51 of the auxiliary vehicles 14 may have a temperature control function such as a freezing or refrigeration function or a heat retention function. In this case, the luggage container 51 may be provided with at least a heat pump, a Peltier element, or a heater. Such a luggage container 51 enables transportation of frozen or refrigerated goods, freshly cooked dishes, or the like, while maintaining their quality. Another luggage container 51 of the auxiliary vehicles 14 may be waterproofed and washable. Such a luggage container 51 can be easily cleaned off with water after transporting dirty luggage with soil, such as outdoor equipment with mud and soil adhered thereon. Still another luggage container 51 of the auxiliary vehicles 14 may have good ventilation and be capable of accommodating living organisms. Such a luggage container 51 enables transportation of pet animals, plants, and other living organisms. Still another luggage container 51 of the auxiliary vehicles 14 may have an anti-vibration function. For example, the luggage container 51 may have an outer box fixed to the vehicle body and an inner box supported by a damper inside the outer box. Such a luggage container 51 enables transportation of the luggage which is vulnerable to vibration, such as fragile items, precision equipment, or the like, while maintaining their quality.

A communication I/F 52 uses communication technology to communicate with information devices outside the vehicle, such as the taxi vehicle 12, the management device 16, the user terminal 110, and other auxiliary vehicles 14. Such communication may be carried out using mobile data communication provided by mobile phone companies, short-range wireless communication such as Bluetooth, or a dedicated communication line. A communication device for linkage 54 is one of the constituent components of the communication I/F 52, and is a communication device for communicating with the taxi vehicle 12 and other auxiliary vehicles 14. Like the communication device for linkage 36 of the taxi vehicle 12, the communication device for linkage 54 communicates with the taxi vehicle 12 and other auxiliary vehicles 14 to enable the auxiliary vehicle 14 to follow the taxi vehicle 12, which will also be described later.

An auxiliary controller 40 controls driving of the auxiliary vehicle 14. For example, the auxiliary controller 40 calculates the amount of acceleration, deceleration, and steering required to follow the same route as the taxi vehicle 12 which is registered as the linkage target (i.e., the taxi vehicle 12 to be linked), and controls the drive unit 46 according to the calculation results.

The auxiliary controller 40 is also a computer including a processor 42 and a memory 44. Since the auxiliary vehicle 14 is not an automated driving vehicle that runs by itself, the amount of computation required for the travel of the auxiliary vehicle 14 is much less than that of the taxi vehicle 12. Therefore, the auxiliary controller 40 may be constituted of an inexpensive computer with less processing power than the vehicle controller 20.

Figure 6:
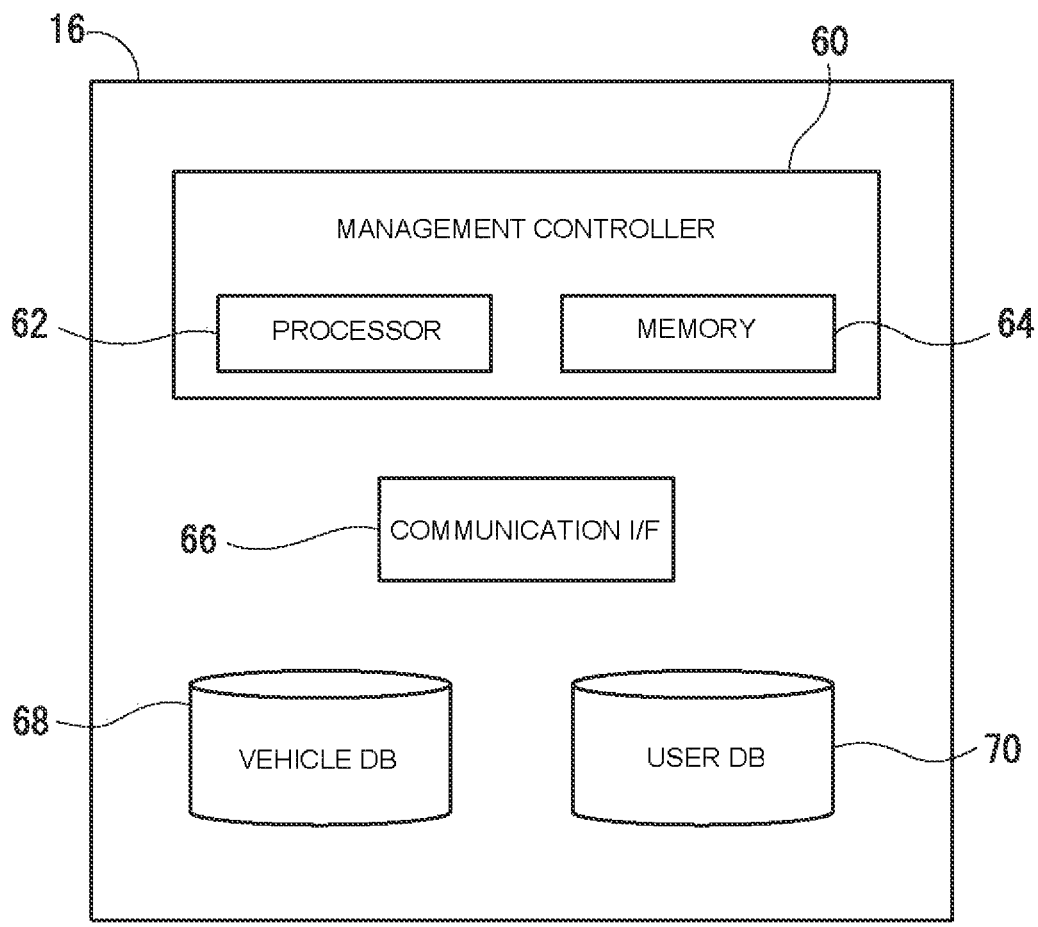
FIG. 6 is a block diagram illustrating a configuration of a management device.

FIG. 6 is a block diagram of the management device 16. The management device 16 includes a management controller 60, a communication I/F 66, a vehicle database (DB) 68, and a user DB 70. The communication I/F 66 communicates with the user terminal 110 via a general-purpose communication network for, for example, mobile data. In addition, the communication I/F 66 communicates with a plurality of taxi vehicles 12 and a plurality of auxiliary vehicles 14 via a general-purpose communication network or a dedicated communication network.

The vehicle DB 68 is a database that records information on the plurality of taxi vehicles 12 and the plurality of auxiliary vehicles 14 that constitute the taxi system 10. Recorded in the vehicle DB 68 are, for example, identification information, the position, the operational state, the linkage state, and the like of individual vehicles 12, 14. Here, the operational state includes, for example, pickup, in service, out of service, standby, and the like. In addition, the linkage state indicates whether the linkage of the vehicles has started. If the linkage has started, the linkage state indicates the identification information of the vehicle to be linked.

The information of the user 100 is recorded in the user DB 70. The information of the user 100 recorded in the user DB 70 includes, for example, identification information, name, payment method, contact information, and the like of the user 100. In addition, the address of a place that the user 100 often sets as the destination 92, such as the home of the user 100 or the company where the user 100 works, may also be recorded in correspondence with the identification information of the user 100.

The management controller 60 controls dispatching and linkage of the taxi vehicle 12 and the auxiliary vehicle 14 in response to the requests from the user 100 transmitted from the user terminal 110. The management controller 60 also updates the vehicle DB 68 in accordance with the information sent from the taxi vehicle 12 and the auxiliary vehicle 14. In addition, the management controller 60 updates the user DB 70 in accordance with the registration information of the user 100 transmitted from the user terminal 110. The management controller 60 is constituted of a computer including a processor 62 and a memory 64.

Next, the control of the taxi system 10 is described. First, the control of the start of use of the taxi vehicle 12 by the user 100 is described. As described above, two types of use of the taxi vehicle 12, the pickup use and the direct use, are provided in the present embodiment. As illustrated in FIG. 2, in the case of the pickup use, the user 100 transmits the usage request 80 to the management device 16. The usage request 80 includes the boarding date and time and the boarding location desired by the user 100. The boarding date and time can be specified as "immediately", rather than a specific date and time.

As described above, the user 100 can also transmit information concerning the use of the auxiliary vehicle 14 with the usage request 80. For example, the user 100 may determine the number and type of the auxiliary vehicles 14 needed by taking into account the size and type of his or her luggage, and transmit the determined number and type of auxiliary vehicles 14 to the management device 16 as part of the usage request 80.

Alternatively, the user 100 may transmit luggage information 84, which is information about luggage of the user 100, to the management device 16 as part of the usage request 80. The luggage information 84 includes at least the information on the size of the luggage. The information on the size of the luggage may be specific dimension values of the luggage. The information on the size of the luggage may also be an image of the luggage taken in a state in which the size of the luggage can be determined, for example, an image of the luggage taken together with a reference article of known size (e.g., coins, paper money, or the like). The luggage information 84 may also include information on the characteristics of the luggage, such as "refrigerated item", "fragile", and the like.

When the usage request 80 includes an auxiliary request, the management device 16 specifies the number and type of the auxiliary vehicles 14 required to meet the auxiliary request. Specifically, if the desired number and type of the auxiliary vehicles 14 are specified as the auxiliary request, the management device 16 dispatches the auxiliary vehicles 14 as so specified. On the other hand, if the auxiliary request includes the luggage information 84, the management device 16 specifies the required number and type of the auxiliary vehicles 14 according to the luggage information 84. In particular, if the luggage information 84 is a captured image of the luggage, the management device 16 calculates the size of the luggage in accordance with the image and determines the number of the auxiliary vehicles 14 required to accommodate the luggage of that size. By having the management device 16 determine the required number of the auxiliary vehicles 14, the user 100 does not need to consider the required number of the auxiliary vehicles 14, and can use the auxiliary vehicles 14 more easily.

Once the number and type of the auxiliary vehicles 14 are determined, the management device 16 links the taxi vehicle 12 to be dispatched to the user 100 with the auxiliary vehicles 14 of the determined number and type. For example, the management device 16 notifies the taxi vehicle 12 and the auxiliary vehicles 14 of the identification and location information of the vehicles 12 and 14 to be linked. Upon receiving the notice, the taxi vehicle 12 and the auxiliary vehicles 14 register each other as the linkage target. In a case where the auxiliary vehicles 14 are located away from the taxi vehicle 12, the auxiliary vehicles 14 cannot follow the taxi vehicle 12 even though they are registered as the linkage target. Therefore, once the auxiliary vehicles 14 are registered as the linkage target, the taxi vehicle 12 moves to the vicinity of the auxiliary vehicles 14 so that the distance between the taxi vehicle 12 and the auxiliary vehicles 14 is less than or equal to the distance at which the auxiliary vehicles 14 can start following the taxi vehicle 12 (hereinafter referred to as the "followable distance"). The auxiliary vehicles 14 start to follow the taxi vehicle 12 once the taxi vehicle 12 reaches within the followable distance. When all the auxiliary vehicles 14 to be linked start following the taxi vehicle 12, the taxi vehicle 12 moves to the boarding location specified by the management device 16. Accordingly, the taxi vehicle 12 and the auxiliary vehicles 14 are dispatched to the user 100.

Next, the control of the direct use is described. In the case of the direct use, as described above, the user 100 directly selects the taxi vehicle 12 and the auxiliary vehicle 14 that the user wishes to use. Specifically, to use the taxi vehicle 12, the user 100 moves to the vicinity of the taxi vehicle 12 which is in the standby state and notifies the taxi system 10 of the intention to start using the taxi vehicle 12, by operating the user terminal 110 or the input device 32 of the taxi vehicle 12. For example, the taxi vehicle 12 may be provided with a button to start using the taxi, and the user 100 may press the button to show the intention to start using the taxi vehicle 12. Alternatively, the taxi vehicle 12 may communicate with the mobile terminal of the user 100 to receive the intention to start using the taxi vehicle 12. For example, the taxi vehicle 12 is equipped with a near field communication (NFC) antenna, and a dedicated taxi application is installed in advance on the mobile terminal of the user 100. Then, the user 100 activates the dedicated taxi application on the mobile terminal 110 and places it near the NFC antenna of the taxi vehicle 12 to communicate with the taxi vehicle 12 and transmits the intention to start using the taxi vehicle 12. Upon receiving the intention to start using the taxi vehicle 12, the taxi vehicle 12 notifies the management device 16 that the taxi vehicle 12 has started transportation of the user 100; i.e., the taxi vehicle 12 is in service.

When the user 100 uses the auxiliary vehicle 14, the taxi vehicle 12 and the auxiliary vehicle 14 need to register each other to establish the linkage registration. For the linkage registration, the user terminal 110 may be used, or the input device provided in the taxi vehicle 12 or the auxiliary vehicle 14 may be used. For example, when the user 100 starts using the taxi vehicle 12, a list of auxiliary vehicles 14 that can be linked to the taxi vehicle 12 may be indicated on the display of the information terminal of the user 100 or the taxi vehicle 12. The auxiliary vehicles 14 that can be linked are the auxiliary vehicles 14 that are in the standby state and located within a predetermined distance from the taxi vehicle 12. The information on available auxiliary vehicles 14 may be provided by the management device 16 or may be acquired by the taxi vehicle 12 or the user terminal 110 communicating with the nearby auxiliary vehicles 14. In either case, the user 100 selects the auxiliary vehicle 14 that the user desires to use from the list shown on the display of the user terminal 110 or the taxi vehicle 12.

The result of selection is transmitted to the taxi vehicle 12 and the auxiliary vehicle 14, and the taxi vehicle 12 and the auxiliary vehicle 14 register each other as the linkage target. Once the linkage registration is completed, the taxi vehicle 12 moves to the vicinity of the auxiliary vehicle 14, or the user 100 manually pushes the auxiliary vehicle 14 to the vicinity of the taxi vehicle 12, so that the auxiliary vehicle 14 can be located within the followable distance from the taxi vehicle 12. Thus, the auxiliary vehicle 14 becomes able to follow the taxi vehicle 12. To enable the user 100 to easily find the auxiliary vehicle 14 to be used by the user 100 (i.e., the auxiliary vehicle 14 with which the linkage registration has been established) among the plurality of auxiliary vehicles 14 waiting at the waiting place 90, the auxiliary vehicle 14 may output something when the linkage registration is completed. For example, the auxiliary vehicle 14 may output a sound, light a lamp, display an image, or the like, to notify the user of the completion of the linkage registration.

Alternatively, the linkage registration of the taxi vehicle 12 and the auxiliary vehicle 14 may be established using NFC (e.g., Bluetooth). In this case, for example, a linkage switch may be provided on the exterior wall of the auxiliary vehicle 14, and the user 100 moves the auxiliary vehicle 14 that the user desires to link to the taxi vehicle 12 to the vicinity of the taxi vehicle 12 to press the linkage switch on the auxiliary vehicle 14. When the switch is pressed, the auxiliary vehicle 14 transmits a signal for linkage to the taxi vehicle 12. The signal for linkage includes, for example, the identification information of the auxiliary vehicle 14. The taxi vehicle 12 displays, on its display or the user terminal 110, the information of the auxiliary vehicle 14 identified in accordance with the received signal for linkage. If the user 100 approves the displayed content, the taxi vehicle 12 notifies the auxiliary vehicle 14 of the data indicating the approval of the linkage as well as its own identification information. Then, the taxi vehicle 12 and the auxiliary vehicle 14 register each other as the linkage target.

Figure 7:
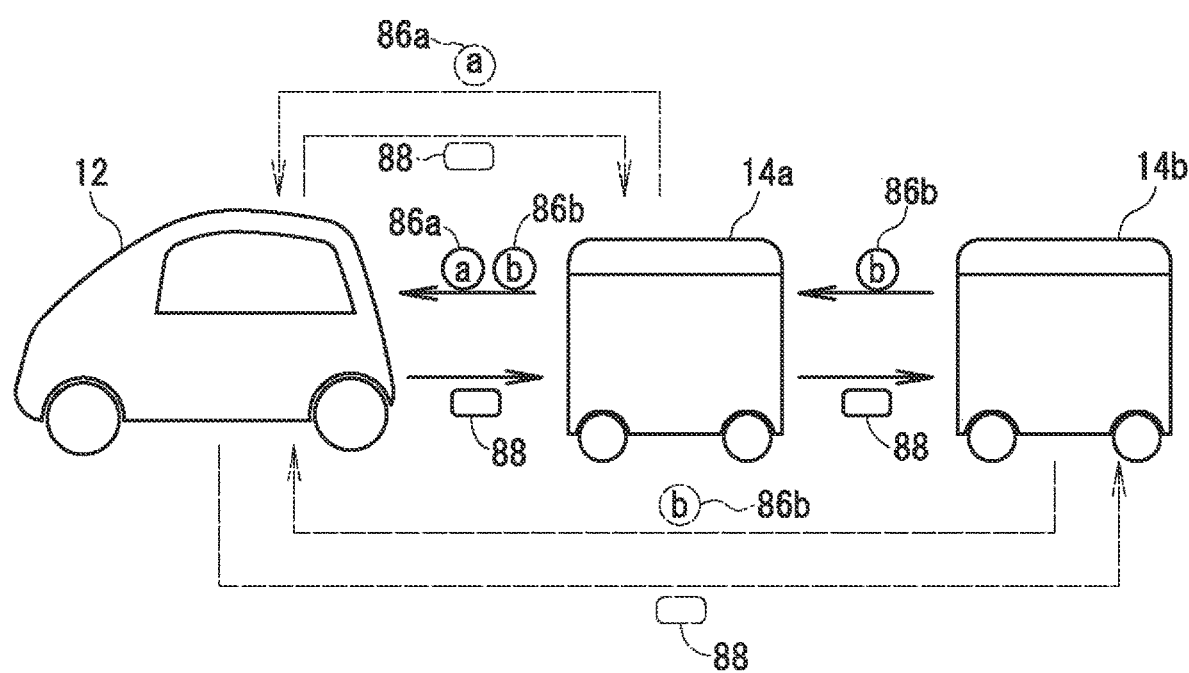
FIG. 7 is a conceptual view illustrating the auxiliary vehicle controlling its acceleration, deceleration, and steering.

Next, the traveling control of the taxi vehicle 12 and the auxiliary vehicle 14 is described. Again, the taxi vehicle 12 is the automated driving vehicle that runs in accordance with the information detected by the vehicle sensor group 28. The auxiliary vehicle 14 does not run by itself and follows the taxi vehicle 12. For the follow-up driving, the auxiliary vehicle 14 may control the acceleration, deceleration, and steering by itself. FIG. 7 is a conceptual diagram illustrating how the auxiliary vehicles 14a and 14b control their own acceleration, deceleration, and steering. In this case, as indicated solid arrows in FIG. 7, each of the taxi vehicle 12 and the auxiliary vehicle 14a outputs a tracking signal 88 to the vehicle running directly behind; that is, the auxiliary vehicle 14a and the auxiliary vehicle 14b, respectively. The tracking signal 88 is a radio wave signal or an ultrasonic signal which is output periodically, and is, for example, a beacon signal using Bluetooth. The following auxiliary vehicles 14*a*, 14*b* each detect the tracking signal 88 by the follow-up sensor 50 and use the detection result to identify the distance and direction to the taxi vehicle 12 or the auxiliary vehicle 14*a* running directly ahead. Then, the auxiliary controllers 40 of the following auxiliary vehicles 14*a*, 14*b* each control the acceleration, deceleration, and steering so as to keep an approximately constant relative positional relation with the preceding vehicle 12, 14, or in other words, to follow the moving trajectory of the preceding vehicle 12, 14.

The auxiliary vehicles 14*a* and 14*b* respectively transmit auxiliary environment information 86, which is the result of detection by the auxiliary sensor group 48, to the preceding vehicles 12 and 14*a* each running directly ahead, as indicated by solid arrows in FIG. 7. When the auxiliary vehicle 14*a* receives the auxiliary environment information 86*b* from the following auxiliary vehicle 14*b*, the auxiliary vehicle 14*a* transmits the auxiliary environment information 86*b* in addition to the auxiliary environment information 86*a* of the auxiliary vehicle 14*a* itself to the preceding vehicle 12.

In accordance with the received auxiliary environment information 86, the taxi vehicle 12 determines whether there is an abnormality (e.g., falling luggage) or a safety problem of the auxiliary vehicles 14. If the abnormality or the safety problem occurs, the taxi vehicle 12 performs a countermeasure operation to eliminate the abnormality or the safety problem. The countermeasure operation includes, for example, pausing the vehicle or sending a notice to the user 100.

The above-described control procedure is only exemplary, and other control procedures in which the auxiliary vehicles 14 can follow the taxi vehicle 12 may be used. For example, each auxiliary vehicle 14 may transmit its own auxiliary environment information 86 directly to the taxi vehicle 12 to be linked, without going through other auxiliary vehicles 14, as indicated by double-dotted lines in FIG. 7. Alternatively, it may be the case that the auxiliary vehicles 14 do not output the tracking signal, and only the taxi vehicle 12 to be linked outputs the tracking signal 88. In this case, the tracking signal 88 needs to have an intensity strong enough to cover all the auxiliary vehicles 14 to be linked to the taxi vehicle 12 registered as the linkage target.

The follow-up sensor 50 is not limited to a signal sensor that detects the tracking signal 88, and other sensors that can detect the position and direction of the vehicle to be tracked may be used. For example, the follow-up sensor 50 may be a camera that captures the image of the vehicle to be tracked, or a sensor that transmits electromagnetic waves or ultrasonic waves and uses the reflected waves to detect the relative position of the vehicle to be tracked.

Although in the above description the auxiliary vehicles 14 control the steering, acceleration, and deceleration by itself, the taxi vehicle 12 to be linked may control the steering, acceleration, and deceleration of the auxiliary vehicles 14. That is, the taxi vehicle 12 to be linked may calculate the amount of steering, acceleration, and deceleration required for follow-up driving in accordance with the auxiliary environment information 86 transmitted from each auxiliary vehicle 14, and transmit the direction to the auxiliary vehicles 14 according to the calculation results. Each auxiliary vehicle 14 drives the drive unit 46 in response to the direction from the taxi vehicle 12 to be linked. This configuration can reduce the amount of calculation of the auxiliary controller 40 and decrease the cost of the auxiliary controller 40 and the auxiliary vehicles 14.

Figure 8:
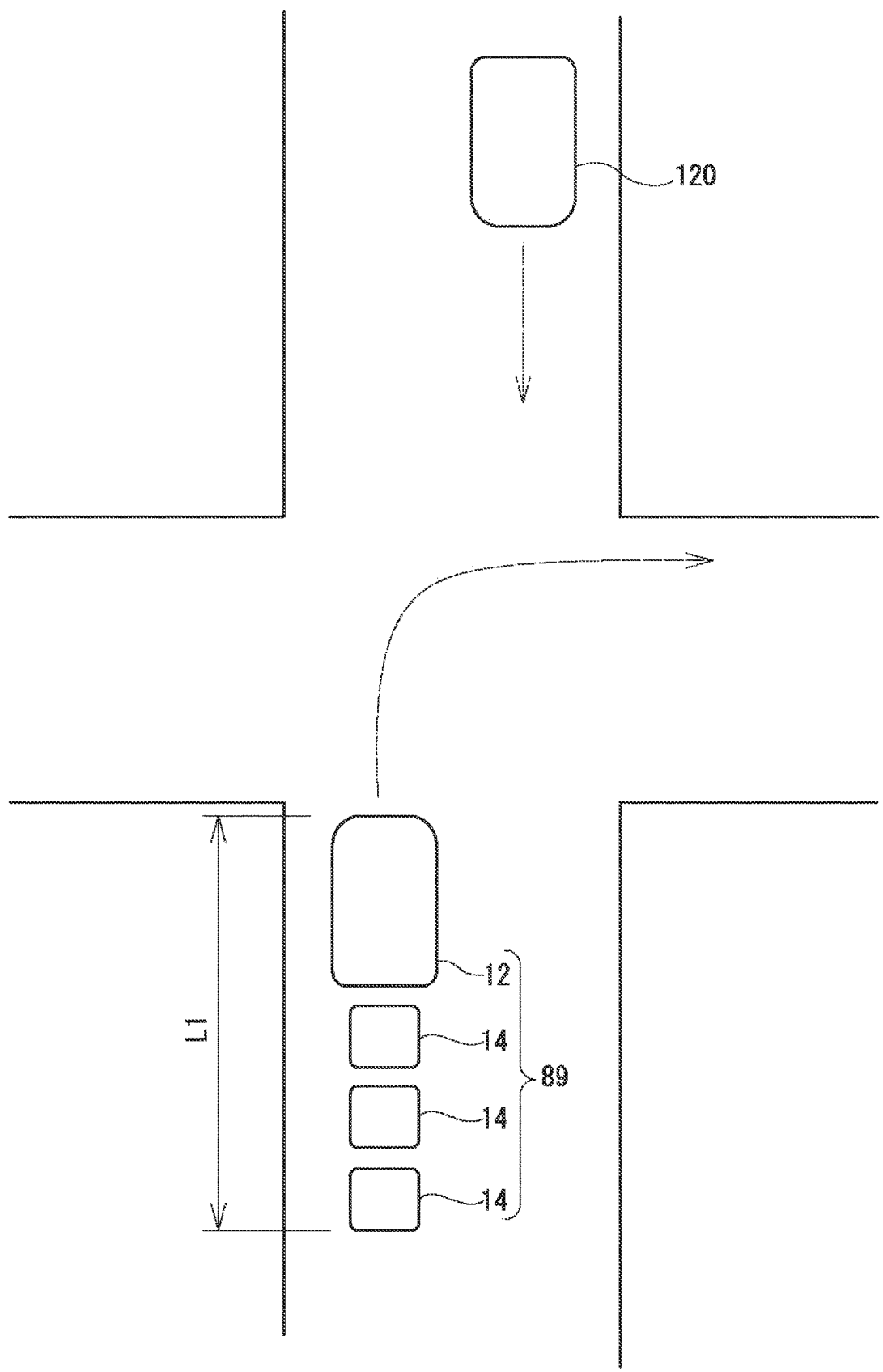
FIG. 8 is a conceptual view illustrating driving control of the taxi vehicle linked with at least one auxiliary vehicle.

Here, the driving control of the taxi vehicle 12 differs between the case where no auxiliary vehicle 14 is linked and the case where at least one auxiliary vehicle 14 is linked. FIG. 8 is a conceptual view illustrating the driving control of the taxi vehicle 12 linked with at least one auxiliary vehicle 14. For example, when the taxi vehicle 12 is linked with at least one auxiliary vehicle 14, the driving control may be executed by taking the length of a vehicle fleet 89 consisting of the taxi vehicle 12 and the at least one auxiliary vehicle 14 as an entire length of the taxi vehicle 12. For example, as shown in FIG. 8, consider the case where the taxi vehicle 12 turns beyond the oncoming lane at the intersection; i.e., turns right in left-hand traffic or turns left in right-hand traffic. In this case, the taxi vehicle 12 estimates time T1 to complete the turn and time T2 for an oncoming vehicle 120 to reach the intersection. If time T2 for the oncoming vehicle 120 to reach the intersection is sufficiently longer than time T1 required for the right or left turn, the taxi vehicle 12 starts the right or left turn. The taxi vehicle 12 calculates time T1 required for the right/left turn by taking into account an entire length L1 of the vehicle fleet 89 including the linked auxiliary vehicles 14 as the entire length of the taxi vehicle 12. In other words, the taxi vehicle 12 calculates the time required for the right/left turn, T1, from the time when the taxi vehicle 12 itself starts the right/left turn to the time when the last auxiliary vehicle 14 completes the right/left turn.

The taxi vehicle 12 is parked after confirming that there is a parking space. When the taxi vehicle 12 is linked with at least one auxiliary vehicle 14, the taxi vehicle 12 is parked only when there is sufficient space for parking the entire vehicle fleet 89.

When the taxi vehicle 12 is linked with at least one auxiliary vehicle 14, the taxi vehicle 12 may change a method of selecting the travel route as compared to the case where no linkage is established. For example, the auxiliary vehicles 14 are usually smaller than the taxi vehicle 12 and have poor driving performance, so the auxiliary vehicles 14 are often unsuitable for traveling on routes with heavy traffic, uneven terrain, or steep grades. Therefore, when the taxi vehicle 12 is linked with at least one auxiliary vehicle 14, the taxi vehicle 12 may determine the travel route so as not to travel on routes unsuitable for travel for the auxiliary vehicles 14. Accordingly, when the auxiliary vehicle 14 is linked, the taxi vehicle 12 may temporarily delete routes unsuitable for travel for the auxiliary vehicle 14 from the map information used to calculate the route, and select a travel route to the destination 92 from the remaining routes.

Although the taxi vehicle 12 and the auxiliary vehicles 14 are linked via vehicle-to-vehicle communication, they are not mechanically connected to each other. Therefore, it is possible that other vehicles or people do not determine that the taxi vehicle 12 and the auxiliary vehicles 14 are linked. In this case, other vehicles and people may be unable to correctly predict the behavior of the auxiliary vehicles 14 that follow the taxi vehicle 12. In addition, there would be a case where other vehicles may intervene between the taxi vehicle 12 and the auxiliary vehicles 14. To solve such problems, the taxi vehicle 12 and the auxiliary vehicles 14 may output information indicating their linkage in a visually recognizable form when viewed from outside. For example, the taxi vehicle 12 and the auxiliary vehicle 14 may have an indicator protruding from their exterior walls (e.g., the top surface of the vehicle) to the outside of the vehicle, and the indicator may show a video indicating that the vehicles are linked while the linkage is effective. Alternatively, the taxi vehicle 12 and the auxiliary vehicles 14 may each have a lamp installed on their exterior walls, and while the linkage is valid, the lamps may be lit in a unified manner. For example, the lamps may be lit with the same color of light, or the lamps may blink continuously and in sequence according to the order in which the vehicles are lined up. Alternatively, the taxi vehicle 12 and the auxiliary vehicles 14 may have projection devices that project images on the road surface, and keep projecting the image onto the road surface indicating the linkage while the linkage is valid. For example, the image projected by the taxi vehicle 12 and the image projected by the auxiliary vehicles 14 linked with the taxi vehicle 12 may constitute a continuous image (e.g., a continuous line or the like).

By outputting the information indicating the linkage in visually recognizable form when viewed from outside, other vehicles and people can act in anticipation that the taxi vehicle 12 and the at least one auxiliary vehicle 14 travel in the linked manner. This further improves the safety of both sides. In addition to the visual information notice, auditory information notice may also be provided. In other words, in addition to the visual and light information notice described above, a voice message indicating the linkage of the vehicles may be output externally via a microphone.

In a case where more than one auxiliary vehicles 14 follow one taxi vehicle 12, the traveling order of the auxiliary vehicles 14 may be specified by the user 100 or automatically determined by the taxi system 10. Thus, for example, the user 100 may specify the traveling order of the auxiliary vehicles 14 upon completion of the linkage registration. Alternatively, the auxiliary vehicles 14 may be lined up and run in the same order as the order of the linkage registration. Alternatively, the traveling order may be determined according to the characteristics of the auxiliary vehicles 14. For example, in general, the closer the auxiliary vehicle is to the taxi vehicle 12, the easier it is to maintain a high level of safety when the auxiliary vehicle 14 follows the taxi vehicle 12. Therefore, the traveling order of the auxiliary vehicles 14 may be determined so that more important or less strong auxiliary vehicles 14 are located in the front. In other words, the taxi vehicle 12 may store the priority order for each type of auxiliary vehicle 14 in advance, determine the order in which the auxiliary vehicles 14 are to be lined up to satisfy the priority order, and notify the auxiliary vehicles 14 to be linked of the determination result.

Next, the control after the user 100 finishes using the taxi vehicle 12 and the auxiliary vehicle 14 is described. Once the taxi vehicle 12 and the auxiliary vehicle 14 reach the destination 92, the user 100 gets out of the taxi vehicle 12 and removes the luggage from the auxiliary vehicle 14. When the luggage removal is completed, the user 100 notifies the taxi vehicle 12 of the intention to end the use of the taxi by using the user terminal 110 or the input device 32 in the taxi vehicle 12. Once the taxi vehicle 12 receives the notice, the taxi vehicle 12 settles the fare of the taxi vehicle 12 and the auxiliary vehicle 14. In addition, the taxi vehicle 12 and the auxiliary vehicle 14 transmit the vehicle state information indicating vacancy of the vehicle to the management device 16. Upon receiving the vehicle state information, the management device 16 sends a new dispatch direction to the taxi vehicle 12 and the auxiliary vehicle 14. The taxi vehicle 12 and the auxiliary vehicle 14 follow the dispatch direction to travel to the next destination or to cancel their linkage.

Figure 9:
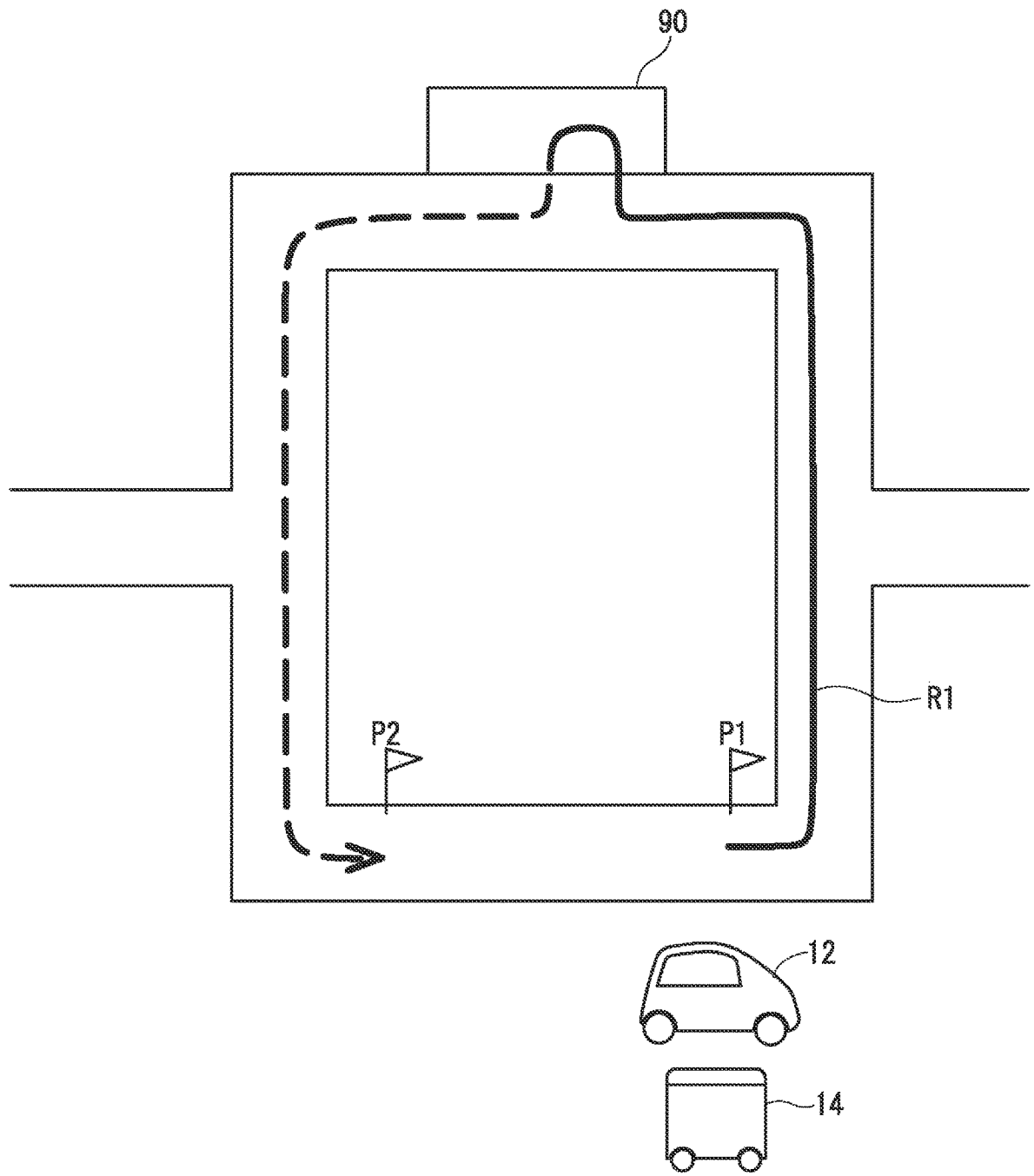
FIG. 9 illustrates an exemplary travel route of the taxi vehicle after use by a user.
Figure 10:
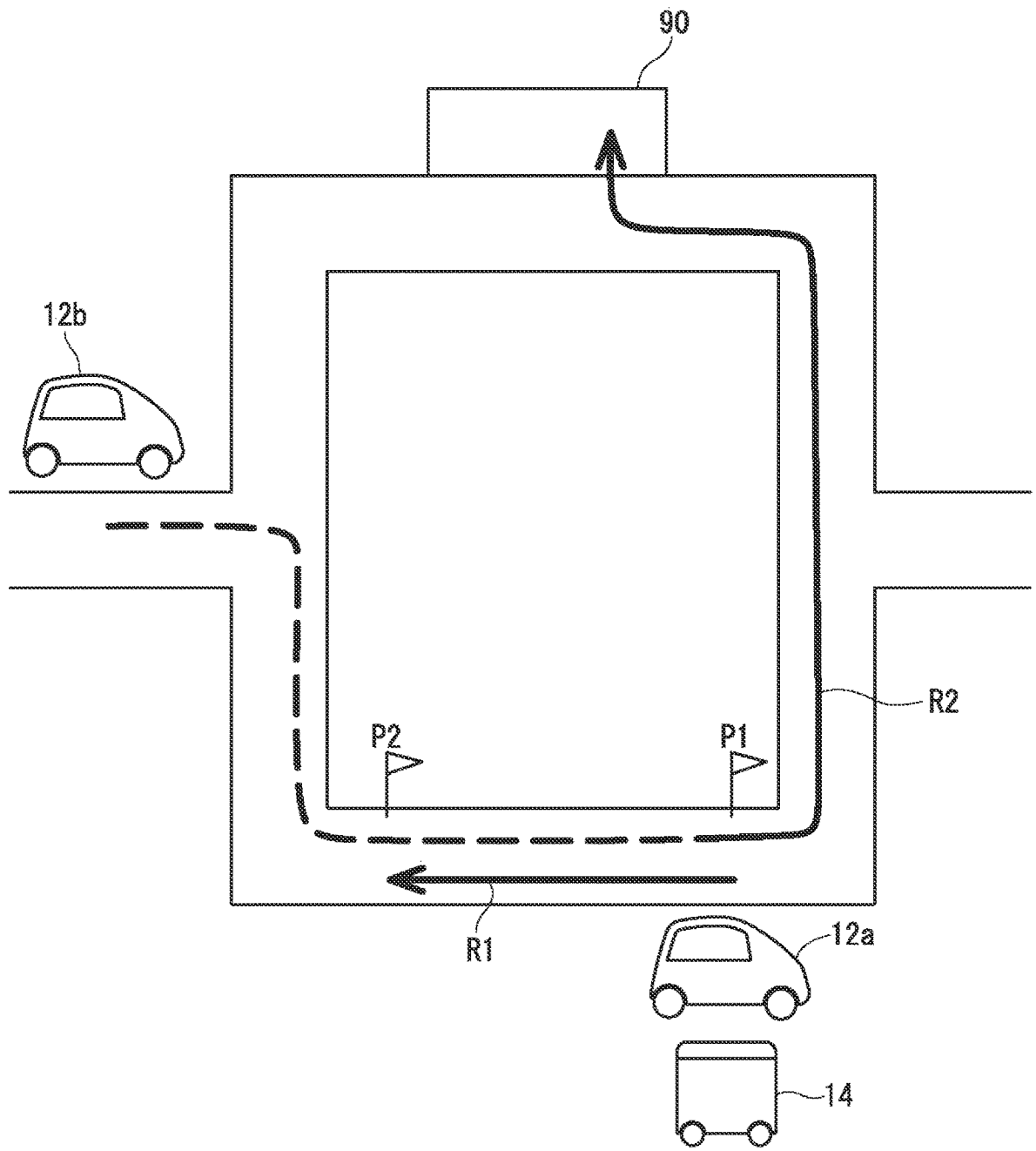
FIG. 10 illustrates another exemplary travel route of the taxi vehicle after use by a user.

Usually, when the use of the vehicle by the user 100 ends, the auxiliary vehicle 14 travels to the designated waiting place 90 as a new destination. Again, however, the auxiliary vehicle 14 cannot run by itself, so that the auxiliary vehicle 14 needs to be led by the taxi vehicle 12 in order to travel to the waiting place 90. The taxi vehicle 12 that leads the auxiliary vehicle 14 to the waiting place 90 may be the taxi vehicle 12 that has been registered as the linkage target until just before the end of use, or the taxi vehicle 12 dedicated for collection and newly dispatched by the management device 16. This will be described below with reference to FIGS. 9 and 10. FIGS. 9 and 10 illustrate exemplary routes on which the taxi vehicle 12 travels after the use by the user 100 ends.

As described above, after the end of the use, the taxi vehicle 12, which has been registered as the linkage target until just before the end of the use, may lead the auxiliary vehicle 14 to the waiting place 90. For example, as shown in FIG. 9, assume that the use by the user 100 ends at position P1, and, after the end of the use, the taxi vehicle 12 is instructed to move to position P2, and the auxiliary vehicle 14 is instructed to move to the waiting place 90. The taxi vehicle 12 may lead the auxiliary vehicle 14 to the waiting place 90 and then move to the position P2, while maintaining the linkage with the auxiliary vehicle 14. Route R1 in FIG. 9 shows the route traveled by the taxi vehicle 12 in this case, and the solid line portion of the route R1 indicates the period during which the linkage with the auxiliary vehicle 14 is maintained, and the dashed line portion indicates the period during which the linkage is cancelled. In this case, the taxi vehicle 12 travels to the waiting place 90 while maintaining the linkage with the auxiliary vehicle 14, and then cancels the linkage with the auxiliary vehicle 14 at the waiting place 90. After that, the taxi vehicle 12 travels to the position P2 which is the new destination indicated by the management device 16.

Alternatively, after the end of the use, the management device 16 may dispatch another taxi vehicle 12 dedicated for collecting the auxiliary vehicle 14. FIG. 10 is a conceptual diagram illustrating travel on routes R1 and R2 of the taxi vehicles 12a and 12b. In this case, the taxi vehicle 12a is de-linked from the auxiliary vehicle 14 once the use by the user 100 ends. Then, the taxi vehicle 12a travels to the new destination, position P2, as instructed by the management device 16. Obviously, the taxi vehicle 12a does not have to go through the waiting place 90. On the other hand, the management device 16 outputs a collection direction to another taxi vehicle 12b in order to collect the auxiliary vehicle 14 waiting at the position P1. The collection direction includes identification information of the auxiliary vehicle 14 to be collected, the collection location (here, position P), and location information of the destination after collection (here, the waiting place 90). The taxi vehicle 12b moves to the position P1 and starts to link up with the auxiliary vehicle 14 in accordance with the collection direction. Once the linkage with the auxiliary vehicle 14 is established, the taxi vehicle 12b travels to the waiting place 90. In FIG. 10, the taxi vehicle 12b collects only one auxiliary vehicle 14, but the taxi vehicle 12b may travel through multiple points to collect the auxiliary vehicles 14 at every point, and then travel to the waiting place 90.

As it is clear from the above description, the taxi system 10 of the present embodiment improves the convenience of the user 100 by carrying and transporting the luggage that cannot be loaded in the taxi vehicle 12 by the auxiliary vehicle 14. Since the auxiliary vehicle 14 runs by following the taxi vehicle 12, no advanced and expensive sensors and controllers are needed for automated driving of the auxiliary vehicle 14, so that the cost of luggage transportation can be reduced. Accordingly, the convenience of the user 100 is improved, while minimizing the cost increase. The configuration described herein thus far is merely an example and may be changed in part as necessary so long as the taxi vehicle 12 transports the user 100 by autonomous driving and the at least one auxiliary vehicle 14 runs by following the taxi vehicle 12 to be linked while carrying the luggage.

REFERENCE SIGNS LIST

10 Taxi system
12 Taxi vehicle
14 Auxiliary vehicle
16 Management device
20 Vehicle controller
22, 42, 62 Processor
24, 44, 64 Memory
26, 46 Drive unit
28 Vehicle sensor group
30 Output device
32 Input device
34, 52, 66 Communication I/F
36, 54 Communication device for linkage
40 Auxiliary controller
48 Auxiliary sensor group
50 Follow-up sensor
51 Luggage container
60 Management controller
68 Vehicle DB
70 User DB
80 Usage request
82 Dispatch direction
84 Luggage information
86 Auxiliary environment information
88 Tracking signal
89 Vehicle fleet
90 Waiting place
92 Destination
100 User
110 User terminal

The invention claimed is:

1. A taxi system, comprising:
a taxi vehicle that runs autonomously with a user on board and transports the user; and
at least one auxiliary vehicle capable of registering the taxi vehicle as a linkage target and running by following the taxi vehicle to be linked with luggage loaded in the at least one auxiliary vehicle, wherein after the use of the auxiliary vehicle ends, if a first destination which is a new destination of the taxi vehicle and a second destination which is a new destination of the auxiliary vehicle differ from each other, the taxi vehicle keeps the link with the auiliary vehicle and runs to the second destination to guide the auxiliary vehicle to the second desintation, and then runs to the firsst destination; and
a management device that manages dispatching of the taxi vehicle and receives a usage request of the taxi vehicle from the user, wherein when the received usage request includes information on size of the luggage, the management device determines a number of the auxiliary vehicles to be dispatched to the user in accordance with the information on the size of the luggage, and dispatches the taxi vehicle and the auxiliary vehicle to the user with the determined number of the auxiliary vehicles linked with the taxi vehicle.

2. The taxi system according to claim 1, wherein
the auxiliary vehicle includes an auxiliary sensor group including at least one of a sensor that detects a driving environment of the auxiliary vehicle and a sensor that detects a loading state of the luggage, and
the auxiliary vehicle transmits a detection result of the auxiliary sensor group to the taxi vehicle to be linked.

3. The taxi system according to claim 1, wherein
the auxiliary vehicle includes a follow-up sensor that directly or indirectly detects a relative positional relation with the taxi vehicle to be linked, and
the auxiliary vehicle controls acceleration, deceleration, and steering of the auxiliary vehicle in a manner that a detection result of the follow-up sensor maintains a specified relative positional relation.

4. The taxi system according to claim 1, wherein
when the taxi vehicle is linked with the at least one auxiliary vehicle, the taxi vehicle controls driving of the taxi vehicle by taking an entire length of a vehicle fleet consisting of the taxi vehicle and the at least one auxiliary vehicle as an entire length of the taxi vehicle.

5. The taxi system according to claim 1, wherein
the taxi vehicle and the at least one auxiliary vehicle output, when linked with each other, information indicating the linkage in a visually recognizable form when viewed from outside.

6. The taxi system according to claim 1, wherein
the auxiliary vehicle includes a luggage container to hold the luggage, and
the taxi system includes the auxiliary vehicles of a plurality of types having different characteristics of the luggage container.

7. The taxi system according to claim 1, further comprising:
at least one waiting place where the at least one auxiliary vehicle linked with no taxi vehicle is waiting, wherein
the user is allowed to select the auxiliary vehicle to be used by the user from the at least one auxiliary vehicle waiting at the waiting place.

8. The taxi system according to claim 5, wherein:
each of the taxi vehicle and the at least one auxiliary vehicle has a projection device that projects an image on a road surface,
the projection device of the taxi vehicle projects a first image and the projection device of each of the at least one auxiliary vehicle projects a second image while the linkage between the taxi vehicle and the at least one auxiliary vehicle is valid, and
the first image and the at least one second image constitute a continuous image.

9. The taxi system according to claim 1, wherein
when the taxi vehicle is linked with at least two auxiliary vehicle, line-up orders of the at least two auxiliary vehicles are determined so that a more important or less strong auxiliary vehicle is located closer to the taxi vehicle.

* * * * *